Charles H. Coney
*INVENTOR.*

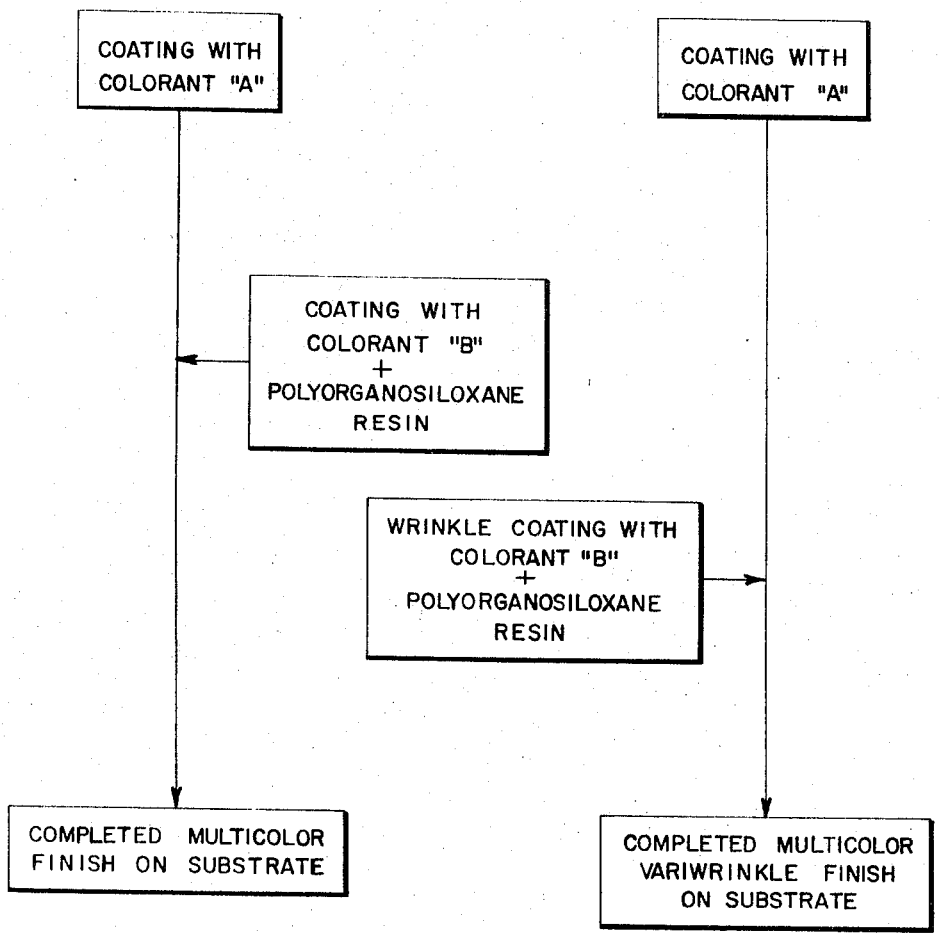

Charles H. Coney
INVENTOR.

United States Patent Office 3,355,312
Patented Nov. 28, 1967

3,355,312
MULTICOLOR COATING PROCESS AND COATED ARTICLE
Charles H. Coney, Kingsport, Tenn., assignor to Eastman Kodak Company, Rochester, N.Y., a corporation of New Jersey
Filed Nov. 27, 1963, Ser. No. 326,345
8 Claims. (Cl. 117—41)

This invention relates to multicolor coating systems, and to a method for obtaining multicolor coatings.

One object of my invention is to provide a multicolor coating system. Another object of my invention is to provide a method for obtaining multicolored coatings. A further object of my invention is to provide multicolored coatings which have a wrinkled effect. Other objects of my invention will appear herein.

In its broader aspects, my invention relates to multicolored articles comprising a substrate having coated thereon, in any order, a first coating comprising polyorganosiloxane, compatible film former and colorant, and a second coating comprising a film former and a different colorant than that employed in the first coating.

In one embodiment of my invention, I provide multicolored articles comprising a substrate having coated thereon, in any order a first coating containing 20–40 parts of a mixed fatty acid ester of cellulose containing acetyl and fatty acid radicals of 3–4 carbon atoms; 20–60 parts of an alkylated ureaformaldehyde resin; 10–30 parts polyepoxide compound; 0–10 parts acid catalyst; and a colorant; and a second coating having a composition as defined above but containing a different colorant and 0.005–1 part polyorganosiloxane resin, the coatings being superposed.

In another embodiment of my invention, I provide articles having coatings thereon essentially the same as described in the preceding paragraph, at least one of said coatings containing 0.1–10 parts of an amine selected from the group consisting of the secondary and tertiary aliphatic amines containing 2–4 carbon atoms. Such coatings in addition to being multicolored also have a wrinkle appearance.

In accordance with my invention, a substrate is coated, in any order, with a coating comprising polyorganosiloxane resin, a film former compatible with the polyorganosiloxane and a colorant, and another coating comprising a film former and a different colorant. The first coating to be applied is allowed to dry until it is tacky or fluid-soft, and the other coating is applied thereover. In accordance with this method, multicolored coatings are obtained, the colors of which do not remain discrete at the interface of the different color areas, but rather the colors flow together to product yet another color in areas in which the different colors intermingle.

In the drawings:

FIGURE 1 is a flow diagram showing a process for producing a multicolor finish in accordance with my invention.

FIGURE 2 is a flow diagram showing a process for producing a multicolor-variwrinkle finish in accordance with my invention.

FIGURES 1 and 2 are the flow diagrams containing legends to render self-descriptive the steps of the process used to produce the multicolor finish and the multicolor-variwrinkle finish of my invention.

Figure 3:
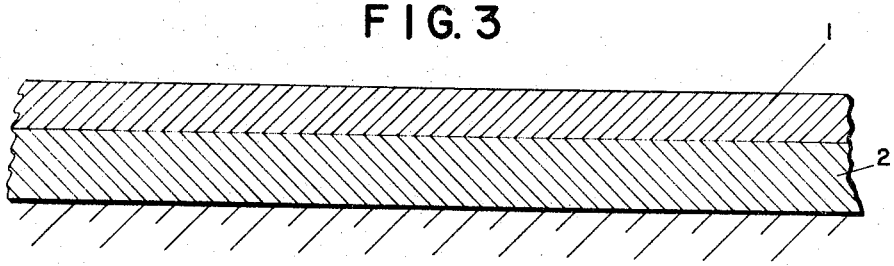
FIGURE 3 is a diagrammatic view of a multicolor finish made in accordance with my invention immediately after spraying.
Figure 4:
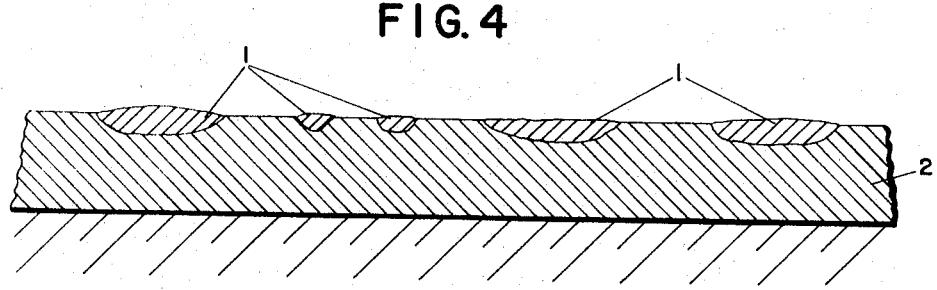
FIGURE 4 is a diagrammatic view of the multicolor finish of FIGURE 3 after completely drying.

The coating process shown in FIGURE 1 will initially, when sprayed on a substrate, produce a product that appears to be two distinct layers of different color coatings, as shown in FIGURE 3 with one layer being designated by reference numeral 2. After drying, as shown in FIGURE 4, the two coats or layers tend to flow each into the plane of the other thereby forming islands of varying thickness of color on the base coating or layer to give a pleasing multicolor effect.

Figure 5:
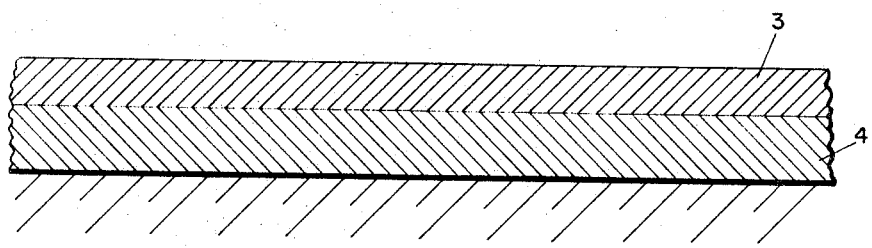
FIGURE 5 is a diagrammatic view of a multicolor-variwrinkle finish made in accordance with my invention immediately after spraying.
Figure 6:
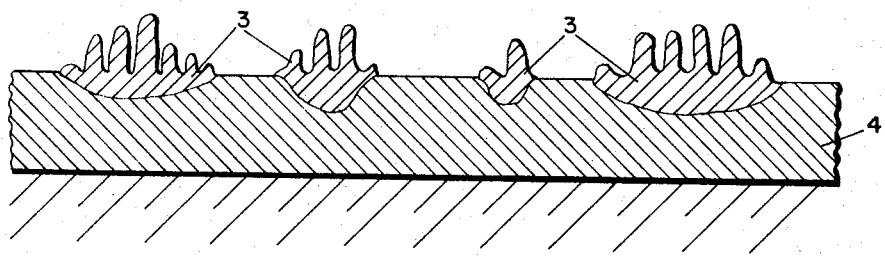
FIGURE 6 is a diagrammatic view of the multicolor-variwrinkle finish of FIGURE 5 after completely drying and airing.

The coating process shown in FIGURE 2 will initially, when sprayed on a substrate, produce a product which in cross section appears to be two layers 3, 4 of different color coatings as shown in FIGURE 5. After drying and curing the finished coating will have a base layer 4 which has islands of layer 3 supported therein. The islands 3 of coating material will be of varying thickness and will result in different tones of color over the surface due to the difference in thickness. The islands 3 of coating materials will also upon curing present a wrinkled appearance due to the presence of the amine in said coating.

My invention will be further illustrated in the following examples. In these examples, the following base lacquer was employed:

| Ingredient: | Parts by weight |
|---|---|
| Cellulose acetate butyrate (about 37% butyryl, 13% hydroxyl and having ½-second falling ball viscosity) | 8.56 |
| Butylated ureaformaldehyde resin | 15.30 |
| Pigment dispersion | 1.00 |
| Polyglycidyl ether of ethylene glycol, epoxide equivalent of 280–375 | 5.34 |
| Toluene | 21.10 |
| Isobutyl acetate | 4.70 |
| Acetone | 23.10 |
| p-Toluene sulfonic acid (50% in butanol) | 2.00 |

*Example 1*

A first lacquer, designated as part 1, was formulated using the base lacquer described above, the pigment dispersion thereof consisting of one part cadmium red in one part cellulose acetate butyrate. To this lacquer was added 0.02 part of methylated polyorganosiloxane liquid. A second lacquer, designated as part 2, was formulated by employing in the base lacquer described above a pigment dispersion consisting of 1 part phthalocyanine blue, 5 parts titanium dioxide and 4 parts of cellulose acetate butyrate. A portion of part 1 of this example was sprayed onto an aluminum surface to provide a heavy coating, and within 2 minutes, while the first coating was still wet, a coating of part 2 of this example was sprayed over the first coating. A pleasing, multicolored effect was obtained in which there were areas of red on a blue matrix. The process was then reversed, with part 1 of this example being sprayed over part 2 in accordance with the method described above. A different coloring effect was obtained, the coating having small blue areas on a red matrix.

*Example 2*

Part 1 of Example 1 was modified with 0.5 part per hundred triethylamine wrinkling agent, coated onto an aluminum surface and within 2 minutes part 2 of Example 1 was sprayed thereover. A multicolored wrinkle finish was obtained having wrinkled red areas in a smooth, glossy blue matrix. As a variation, part 2 of Example 1 was coated onto the aluminum substrate and within 2 minutes thereafter part 1 of Example 1, modified with 0.5 part per hundred triethylamine wrinkling agent, was coated thereon. The coating obtained had a smooth finish with circular blue areas spaced in a red, wrinkled netlike matrix.

In accordance with my invention, it is necessary to employ a polyorganosiloxane. Preferably, a methylated polyorganosiloxane is employed. The most useful polyorganosiloxanes have the following general structure:

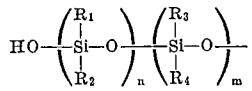

wherein $R_1$, $R_2$, $R_3$ and $R_4$ are each selected from the group consisting of lower alkyl (preferably methyl) and aryl (preferably phenyl) and $n$ and $m$ are whole numbers. Other useful polyorganosiloxanes are those wherein $R_1$, $R_2$, $R_3$, and $R_4$ of the above formula are methyl and phenyl so chosen that each silicone unit contains only methyl or only phenyl substituents, and the ratio of phenyl to methyl is from 4:1 to 1:4, and $n$ plus $m$ is 6 to 40. It is to be understood that the general formula as described herein and in the appended claims may also embrace polyorganosiloxanes in which some cross-linking may be present.

Any film former compatible with the polyorganosiloxanes may be employed in accordance with the invention. Suitable film formers include the acrylic polymers, such as copolymers of ethylacrylate and acrylic acid, or methylmethacrylate and acrylic acid; the organic and inorganic cellulose esters including cellulose acetate, cellulose acetate butyrate, cellulose acetate propionate, cellulose acetate phthalate, cellulose nitrate and the like. In addition, alkyd resins may be employed, such as those prepared from glycerol and phthalic anhydride.

In preferred coating compositions, I employ a mixed fatty acid ester of cellulose containing acetyl and fatty acid radicals of 2-3 carbon atoms, such as cellulose acetate butyrate or cellulose acetate propionate, together with alkylated ureaformaldehyde resin, polyepoxide compound, acid catalyst, optionally an amine wrinkling agent and, of course, the polyorganosiloxane resin and colorant. Especially satisfactory alkylated ureaformaldehyde resins are the butylated ureaformaldehyde resins having the following proportions: 1 mole urea, 1–2 moles formaldehyde and 0.5–2 moles butyl alcohol, although higher molecular weight aliphatic monohydric alcohols may be substituted for a portion of the butanol.

The epoxy compounds which are satisfactory for use in the preferred compositions of the invention are the reaction products of epichlorohydrin and a polyhydric compound, such as bis-phenol and ethylene glycol, or some other higher molecular weight glycol, preferably having an epoxide equivalent (see page 6 of Shell Bulletin on Epon Resins, Technical Publication SC:52–31) of 140–375. Polyglycidyl ethers of an aliphatic polyol give especially satisfactory results. Other epoxy compounds which may be advantageously employed in the lacquer coating compositions of the invention include those having the following general formula:

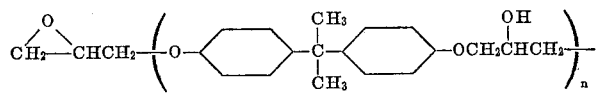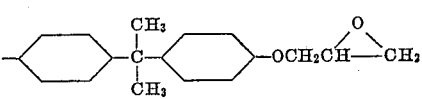

wherein $n$ is a value from 0–2.

The preferred cellulose ester is cellulose acetate butyrate which advantageously has a butyryl content of about 36–42%, a hydroxyl content of 1–4% and a viscosity of 0.05 to 25 seconds as determined by the ASTM D–1343–56 and ASTM D–871–56.

The acid catalyst employed in the preferred coating compositions may be those described in U.S. Patent 2,631,138, and preferably p-toluene sulfonic acid, sulfoacetic acid monohydrate, or mixed alkane sulfonic acids such as are described in U.S. Patent 2,875,164.

Coatings having wrinkled effects may be obtained by adding to at least one of the coatings employed in accordance with the invention a secondary or tertiary aliphatic amine wherein each aliphatic group contains 2–4 carbon atoms. Typical useful secondary amines include diethylamine, dipropylamine, dibutylamine, ethylpropylamine, ethylbutylamine and propylbutylamine and typical useful tertiary amines include, for example, tripropylamine, tributylamine, ethylpropylbutylamine, and dibutylethylamine. Particularly good results are obtained with triethylamine.

The coating of the invention contain colorants. The colorant may be, for example, either a pigment or a dye. Any of the usual pigments and dyes, well known in the art, may be employed in accordance with the invention.

The quantity of polyorganosiloxane employed in the resins of the invention is critical. The generally useful range of polyorganosiloxane in the coating composition is from about 0.005 to about 1%, based on the nonvolatile constituents of the coating. It is necessary to employ the polyorganosiloxane in at least one coating, but it may be employed in all the coatings if desired.

The concentration of pigment and dye in the coatings of the invention is not critical with the one exception that the quantity of pigment must not exceed 10% by weight of the nonvolatile constituents of the coating when an amine wrinkling agent is employed in that coating.

In carrying out the method of coating in accordance with the invention, it is necessary that the first coating or any coating prior to the application of the final coating, should not dry completely but should remain fluid-soft or tacky so that it may be more or less resoftened by the subsequently employed coating. If desired, third and even more coatings may be applied.

Various textures simulating pigskin leather, finely grained leather, polished stone, peacock feathers, ostrich skin or the like may be obtained, for example, by the use of various time intervals between coatings, solvents having different evaporation rates, different film thicknesses, and various concentrations and types of polyorganosiloxanes.

The coatings of the invention may be applied to substrates, such as metals, e.g., aluminum and steel, wood, glass and the like, in any suitable manner, preferably by spraying. However, brushing, dipping and other conventional methods may be employed if desired.

The invention has been described in detail with particular reference to preferred embodiments thereof but it will be understood that variations and modifications can be effected within the spirit and scope of the invention as described hereinabove and as defined in the appended claims.

I claim:

1. Process of preparing a multicolored coating on a substrate which comprises first applying to said substrate, in any order, a first coating comprising 20–40 parts mixed fatty acid ester of cellulose containing acetyl and fatty acid radicals of 3–4 carbon atoms; 20–60 parts alkylated ureaformaldehyde resin; 10–30 parts polyepoxide compound; 0.1–10 parts acid catalyst; and a colorant; and then applying over said first coating, a second coating comprising 20–40 parts mixed fatty acid ester of cellulose containing acetyl and fatty acid radicals of 3–4 carbon atoms; 20–60 parts alkylated ureaformaldehyde resin; 10–30 parts polyepoxide compound; 0.1–10 parts acid catalyst; 0.005 to about 1 part polyorganosiloxane resin and a different colorant than that employed in said first coating.

2. Process of claim 1 in which said polyepoxide compound has an epoxide equivalent of from 140–375 and selected from the group of polyglycidyl ester of an aliphatic polyol and compounds having the following formula:

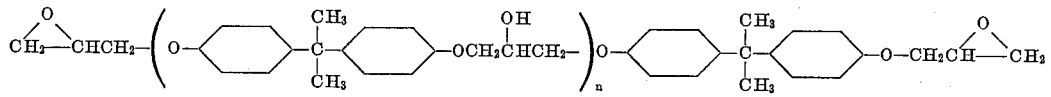

wherein $n$ is a value from 0 to 2.

3. Process of claim 1 in which at least one of said coatings contains 0.1–10 parts of an amine selected from the group of secondary and tertiary aliphatic amines containing 2–4 carbon atoms.

4. Process of claim 1 wherein at least one of said coatings contains 0.1–10 parts triethylamine wrinkling agent.

5. Product made by the process of claim 1.
6. Product made by the process of claim 2.
7. Product made by the process of claim 3.
8. Product made by the process of claim 4.

References Cited
UNITED STATES PATENTS

| | | | |
|---|---|---|---|
| 2,551,233 | 5/1951 | Balis et al. | 117—41 |
| 2,724,704 | 11/1955 | Millar | 117—41 |
| 2,763,568 | 9/1956 | McBride | 117—41 |
| 2,776,225 | 1/1957 | Fletcher | 117—41 |
| 2,866,720 | 12/1958 | Martin et al. | 117—41 |
| 3,003,978 | 10/1961 | Coney et al. | 117—148 |
| 3,149,994 | 9/1964 | Congleton et al. | 117—72 |
| 3,154,427 | 10/1964 | Forrest et al. | 117—41 |

MURRAY KATZ, *Primary Examiner.*